United States Patent
Banik et al.

(10) Patent No.: US 12,316,434 B1
(45) Date of Patent: May 27, 2025

(54) SYSTEM FOR ALLOCATION OF UNSOLICITED GRANTS TO ACCESS SATELLITE UPLINK

(71) Applicant: AMAZON TECHNOLOGIES, INC., Seattle, WA (US)

(72) Inventors: Jyotirmoy Banik, Chula Vista, CA (US); Sandeep Ahluwalia, Sammamish, WA (US); Mohammad Mamunur Rashid, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 116 days.

(21) Appl. No.: 18/315,146

(22) Filed: May 10, 2023

(51) Int. Cl.
  *H04B 7/185* (2006.01)
(52) U.S. Cl.
  CPC ....... *H04B 7/18543* (2013.01); *H04B 7/1855* (2013.01)
(58) Field of Classification Search
  CPC .......................... H04B 7/18543; H04B 7/1855
  See application file for complete search history.

(56) References Cited

U.S. PATENT DOCUMENTS

| | | | | |
|---|---|---|---|---|
| 2003/0058794 A1* | 3/2003 | Pantelias | ............ | H04L 12/2801 370/230 |
| 2007/0025297 A1* | 2/2007 | Lee | ................... | H04W 36/0066 370/395.21 |
| 2011/0222470 A1* | 9/2011 | Satapathy | ........... | H04L 65/1083 370/328 |
| 2011/0286419 A1* | 11/2011 | Cho | ...................... | H04W 72/21 370/329 |
| 2017/0366251 A1* | 12/2017 | Ravishankar | ...... | H04B 7/18513 |
| 2021/0168835 A1* | 6/2021 | Xiao | ..................... | H04L 5/0044 |
| 2022/0022152 A1* | 1/2022 | Liu | ................... | H04W 56/0015 |

(Continued)

OTHER PUBLICATIONS

"3GPP TS 38.321 V16.4.0 (2021003)", Technical Specification, 3rd Generation Partnership Project; Technical Specification Group Radio Access Network; NR; Medium Access Control (MAC) protocol specification (Release 16), Mar. 2021, 157 pgs. Retrieved from the Internet: URL: https://www.3gpp.org/ftp/Specs/archive/38_series/38.321/38321-g40.zip.

(Continued)

*Primary Examiner* — Christine Ng
(74) *Attorney, Agent, or Firm* — Lindauer Law, PLLC

(57) ABSTRACT

A satellite utilizes a scheduler to manage uplink contention by providing a user terminal (UT) with grants to use uplink resources. The scheduler may process buffer data status (BDS) information received from the UT that indicates data enqueued by the UT for transmission on the uplink. Based on the BDS the scheduler provides solicited grants to the UT. When there is no backlog of enqueued data on the uplink, unsolicited grants (USGs) are provided to the UT. The USGs provide the UT with access to the uplink without resorting to a high latency random-access channel. If the UT utilizes the USG, subsequent USGs may be provided at shorter repetition intervals. If the UT does not utilize the USG, subsequent USGs may be provided at longer repetition intervals. The changes to the repetition interval may be asymmetrical, such as decreasing additively and increasing multiplicatively.

20 Claims, 7 Drawing Sheets

(56) References Cited

U.S. PATENT DOCUMENTS

2022/0417981 A1* 12/2022 Li .................... H04B 7/18539
2023/0012050 A1* 1/2023 Dalmiya .......... H04W 28/0942

OTHER PUBLICATIONS

"5G/NR—Scheduling", ShareTechnote, 5 pgs. Retrieved from the Internet: URL: http://www.sharetechnote.com/html/5G/5G_Scheduling.html.

Ding, Zhiguo, "Non-Orthogonal Multiple Access (NOMA): Evolution towards 5G Cellular Networks", School of Computing and Communications, Lancaster University, Apr. 28, 2016, 28 pgs. Retrieved from the Internet: URL: https://www.lancaster.ac.uk/staff/dingz/NOMA.pdf.

Emmelmann, Marc, "TCP/IP Over Satellite", Jul. 24, 2000, 9 pgs. Retrieved from the Internet: URL: http://www.emmelmann.org/Library/Papers_Reports/docs/Tcplp_overSatellite/Tcplp_overSatellite.pdf.

* cited by examiner

SYSTEM FOR ALLOCATION OF UNSOLICITED GRANTS TO ACCESS SATELLITE UPLINK

BACKGROUND

A satellite may provide communication service to many user terminals. These user terminals may be in contention with one another for use of uplink resources to send data from individual user terminals to the satellite.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
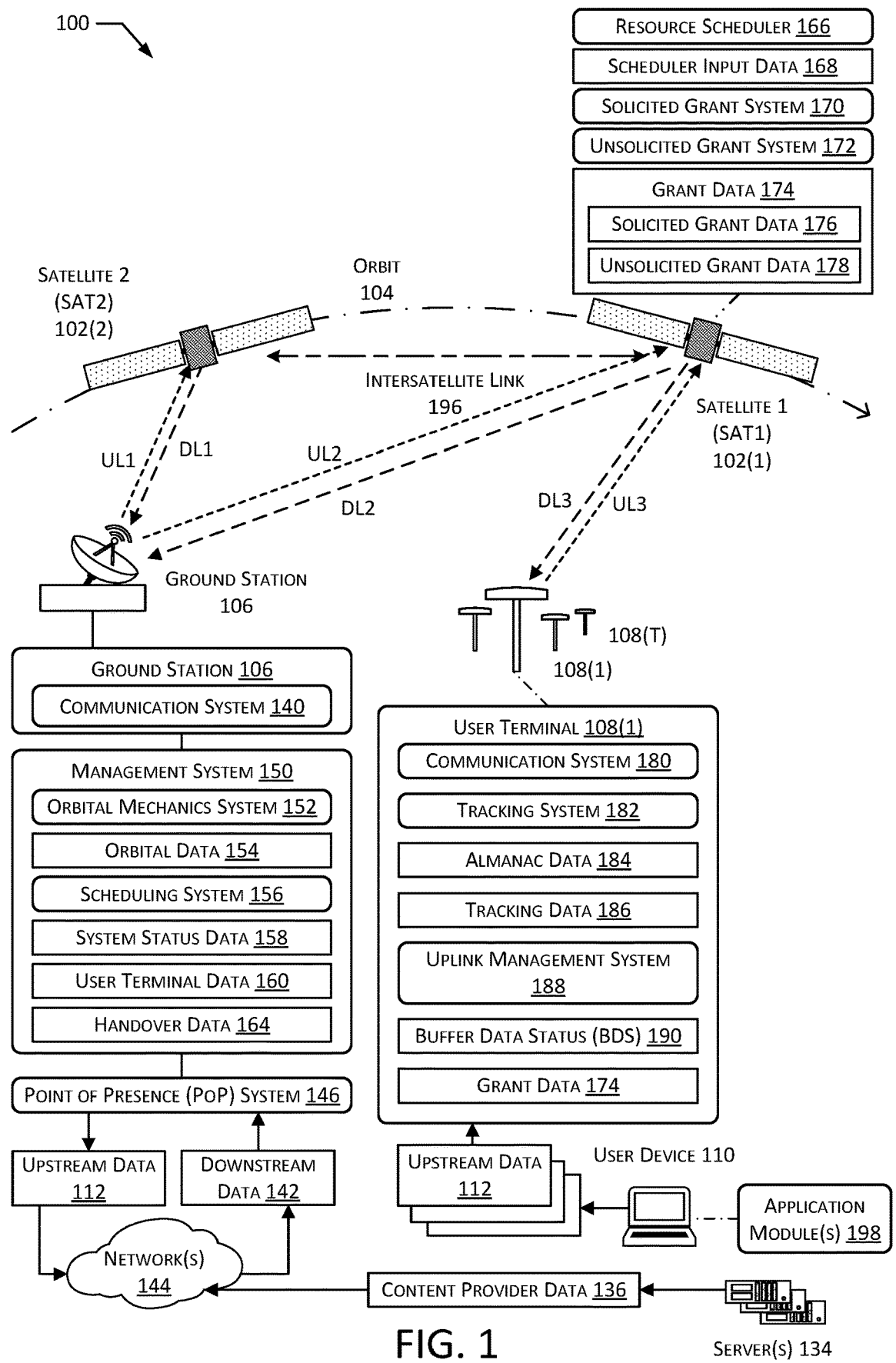
FIG. 1 illustrates a system that uses a satellite uplink management system to provide user terminals with unsolicited grants for uplink resources, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites, the large geographic coverage area of a given satellite, and a substantial number of user terminals served by each satellite, may result in an oversubscribed network that includes several congestion points that restrict the flow of network traffic. One congestion point is an uplink to the satellite, as many individual user terminals contend with each other to use the uplink to send data to the satellite.

The satellites provide communication services between devices, such as user terminals (UT) located on or near a body such as the Earth. For example, a first UT on a first geographic location (geolocation) on the Earth may send upstream data to a first satellite that is in range of the first UT. The first satellite may send the upstream data to a ground station, another satellite, and so forth. For example, the first satellite may send the upstream data to a ground station that in turn sends the upstream data to a point-of-presence (POP). The POP may then send the upstream data to a device on another network, such as a server on the Internet.

Likewise, downstream data destined for the first UT may be received at the PoP. The POP sends the downstream data to the ground station that in turn sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth. One of the factors that determines how long a satellite is within range of the UT is the orbital period of the satellite, that is determined by the altitude of the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. This results in a UT being frequently handed off from one satellite to another to maintain continuous communication services. In comparison, a geosynchronous satellite has an orbital period that coincides with the rotation of the earth, so a geosynchronous satellite appears to remain motionless with respect to the earth. While the apparent motionlessness with respect to the UT removes the need for handoffs, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for an uplink to a satellite. For example, as mentioned earlier, an individual satellite is only within communication range of a UT for a few minutes. Efficient management of the uplink becomes particularly important in this dynamic environment as poor management reduces throughput on the uplink. Reduced throughput may result in data being delayed, dropped, or other unacceptable outcomes.

Traditional techniques of managing an uplink are not intended for and so do not scale well to large numbers of UTs, particularly when those UTs are sending large quantities of data. For example, a sparse number of terminals in a conventional satellite system may each be assigned fixed uplink resources in advance. However, this system is inflexible and results in unused capacity in the event a UT has no data to send. In another example, a sparse number of terminals making relatively short transmissions may attempt to use the uplink by transmitting at any time. However, this approach fails as the number of UTs transmitting on the uplink increases, the duration of transmissions increases, or both. As a result, traditional techniques of managing an uplink are infeasible in a large satellite network that may involve thousands of satellites and millions of UTs.

The UT may request uplink resources using a random access channel (RACH) implementing a non-orthogonal multiple access (NOMA) to send a buffer data status (BDS) message to the satellite. The BDS provides information about a characteristic of the upstream data enqueued for transmission, such as priority, and amount of upstream data enqueued for transmission on the uplink.

Responsive to the BDS, a resource scheduler onboard the satellite may issue a solicited grant. The solicited grant specifies communication resources for the uplink that are assigned to the UT, such as a timeslot, frequency slot, modulation, coding scheme, and so forth. The use of the BDS also substantially reduces overall latency by having a single transmission from the UT inform the satellite, compared to other multi-step techniques.

During operation, the UT may continue to receive upstream data to send to the satellite. The UT may send additional BDS messages to the satellite using the previously granted uplink communication resources, avoiding the need to send a request using the RACH, and thus reducing congestion on the RACH.

However, once the solicited grants have been used, subsequent use of the uplink would require the UT to utilize the RACH to send a BDS. This results in a substantial increase in latency to the transfer of data on the uplink, due to the contention and delays associated with the RACH. The problem may be exacerbated during certain types of usage, such as traffic that is intermittent or bursty. For example, opening a web page in a web browser may produce an initial and relatively unpredictable set of downstream traffic to many different servers providing various functions such as content, advertising, metrics, and so forth, and corresponding upstream traffic comprising responses. Traditional systems may result in significant latencies as the RACH channel is accessed to request resources for the upstream traffic.

Described in this disclosure is a satellite uplink management system that uses dynamic allocation of unsolicited grants to provide access to uplink resources, reducing the use of a random access channel (RACH) to request solicited grants. The reduction in use of the RACH reduces contention on the RACH, reduces bandwidth requirements associated with the RACH, and eliminates the delays associated with using the RACH to request solicited grants. The system may be operated in conjunction with solicited grants.

The resource scheduler onboard the satellite issues unsolicited grants. These grants are unsolicited in that they are not responsive to a BDS or other information indicative of traffic that is enqueued for transmission on the uplink to the satellite. For example, an unsolicited grant may be provided only when the resource scheduler indicates enqueued uplink data as known by the resource scheduler is less than a threshold value, such as zero. The unsolicited grant specifies communication resources for the uplink that are assigned to the UT, such as a timeslot, frequency slots, and so forth.

The unsolicited grant is issued by the resource scheduler based on scheduler input data. The scheduler input data may include information associated with particular UTs such as a scheduling offset and inferred backlog value.

The scheduling offset is indicative of a delay associated with communication between the satellite and the particular UT. For example, the scheduling offset may be indicative of a propagation time indicative of a time-of-flight of a signal between the satellite and the UT, processing delays associated with the communication system, and so forth.

The inferred backlog value is indicative of difference between total current enqueued bytes and total current granted bytes that are associated with the particular UT. The total current enqueued bytes comprises the total number of enqueued bytes that are known at the resource scheduler. For example, the total current enqueued bytes may comprise a sum of the bytes indicated by the BDS that have been received from the UT by the satellite. The total current granted bytes comprises the total number of bytes that have been allocated in issued grants, but have not yet been used.

During operation, when the resource scheduler determines the inferred backlog is zero, an initial repetition interval is determined and a first set of unsolicited grants are sent at the first repetition interval. If the UT utilized one of the first set of unsolicited grants, a subsequent repetition interval is determined that is shorter than the initial repetition interval. If the UT did not utilize the first set of unsolicited grants, the subsequent repetition interval is determined that is longer than the initial repetition interval. A second set of unsolicited grants are then sent at the subsequent repetition interval. The changes in the repetition interval may be asymmetrical. For example, increases in the repetition interval may increase by a fixed multiplier value while decreases result from a subtraction of a fixed value. Over time the repetition interval dynamically adjusts for the particular UT.

With regard to these various techniques, the UT remains able to use the unsolicited grants or the RACH to send BDS and request additional uplink resources as called for by changing conditions. The techniques may thus be operating concurrently, with solicited grants from BDS, unsolicited grants based on scheduler input data, and so forth.

By using the system and techniques described in this disclosure, the UT is able to minimize the use of the RACH channel, resulting in a substantial reduction in the latency of upstream data and a reduction in the data sent using the RACH channel. The determination of the repetition interval and issuance of grants is computationally efficient and provides efficient allocation of the uplink resources. Overall uplink utilization is also improved, allowing more UTs to utilize communication services.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with its antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminals (UTs) 108, and user devices 110. Each user device 110 may execute one or more application modules 198. For example, the application modules 198 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 196 provides for communication between satellites 102 in the constellation.

One or more ground stations 106 are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 144. For example, the ground station 106 may connect to a terrestrial fiber optic communication network 144. The ground station 106 may act as a network gateway, passing data between the one or more communication networks 144 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. These communication parameters may be associated with operation of an uplink to the satellite 102, downlink from the satellite 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use an ISL 196 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

In some implementations (not shown), the management system 150 may include one or more of a solicited grant system 170 or an unsolicited grant system 172 as described herein.

During operation of the system, a UT 108 is handed off from a first satellite 102(1) to a second satellite 102(2). In one implementation, state data indicative of a state of a resource scheduler 166(1) of the first satellite 102(1) may be sent to a resource scheduler 166(2) of the second satellite 102(2). In another implementation, the management system 150 may provide state data to the resource scheduler 166(2) of the second satellite 102(2). In some implementations, the first satellite 102(1) may send the schedular input data 168 or other information from the resource scheduler 166 of the first satellite 102(1) to the second satellite 102(2) to facilitate operation after the handover. The resource scheduler 166 is discussed in more detail below.

The UT 108 includes a communication system 180, such as a satellite network interface, to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules 198. The data includes upstream data 112 sent by the user device 110 or downstream data 142 that is addressed to the UT 108 or the user device 110. For example, during operation the application module 198 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time-of-flight correction, or other information associated with a specified time. The determination of the tracking data 186 may be ongoing. For example, the first UT 108 may determine tracking data 186 every 100 ms, every second, every five seconds, or at other intervals.

The UT 108 may send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

The uplink may comprise a plurality of channels. A channel may be a particular combination of one or more of a frequency, time division, modulation, access modalities, and so forth. During operation of the UT 108, an uplink management system 188 may be used to determine one or more messages, such as buffer data status (BDS) 190 messages. The uplink management system 188 may send these messages using one or more of the channels.

The uplink may comprise a random access channel (RACH). The RACH may be random access in that individual UTs 108 may utilize the RACH on an ad hoc basis without prior knowledge of whether other UTs 108 may be transmitting at that time. The RACH provides the advantage of allowing for on-demand access to the satellite 102, increasing utilization. However, the RACH is susceptible to congestion if too many UTs 108 attempt to use the RACH at the same time. If the RACH is congested, messages from the UT 108 to the satellite 102 may not be received, may be retransmitted, and so forth. Use of the RACH also introduces additional delays due to round-trip travel time. For example, utilization of the RACH may involve sending a RACH message including BDS, followed by a wait for solicited grant data 176 to be received, followed by a wait for the next transmit interval specified by the solicited grant data 176 to arrive. As a result, use of RACH introduces substantial latency into sending upstream data 112 using the uplink.

The RACH may also implement other techniques, such as a non-orthogonal multiple access (NOMA) to the RACH. A NOMA architecture is able to operate when two or more transmissions at least partially overlap in time and space. For example, a NOMA architecture may operate on the uplink, allowing UT 108(2039) and UT (3939) to both send messages to the satellite 102(1) during the same time and using the same frequency(s). While NOMA reduces constraints with regard to time and frequency of transmission on the uplink, there are still limits with regard to congestion on the uplink.

By using the system described herein to provide unsolicited grants, the use of the RACH is reduced. This allows a single satellite 102 to provide communication service to a large number of UTs 108. Because the use of RACH is reduced, the latencies associated with the use of the RACH are also reduced or eliminated.

The uplink may also include one or more granted channels. Depending upon the implementation, a UT 108 may be allocated one or more granted channels. A granted channel is specified by communication resources specified by the grant data 174 provided by the resource scheduler 166. For example, grant data 174 may specify communication resources for the uplink that are assigned to the UT 108, such as a timeslot, frequency slot, modulation, coding scheme, and so forth. The resource scheduler 166 determines the grant data 174 that allocates these communication resources.

During operation, the uplink management system 188 may maintain one or more buffer groups. Each buffer group comprises a buffer queue to store upstream data 112 for transmission to the satellite 102 on the uplink. Each buffer group may be associated with an amount of data that is greater than or equal to zero. Each of these buffer groups may be associated with a particular characteristic. For example, the buffer groups may be associated with priority such that buffer group 0 is associated with highest priority data. Continuing the example, buffer group 5 may be associated with data having a lesser priority than buffer group 0. Priority for data in a buffer group may be determined based on a variety of factors, such as quality of service (QOS) flags for associated data, prior delays in transmission, and so forth. For example, remaining unsent data in buffer group 7 at a first time may be moved to buffer group 4 at a second time.

The uplink management system 188 may use a granted channel, such as indicated by grant data 174, or the RACH, to send a message such as buffer data status (BDS) 190 to the satellite 102.

The BDS 190 provides information about upstream data 112 that a UT 108 has enqueued for transmission to the satellite 102 on the uplink. This information may include one or more of priority, approximate amount of that data, and so forth. In some implementations a short BDS 190 may be used that minimizes the overall size of the data transmitted. For example, the BDS 190 may be 8 bits in length. This reduces transmission time. In some implementations, the uplink management system 188 may send longer BDS 190 that contains additional information, such as an amount of data enqueued for one or more buffer groups. If no upstream data 112 has been enqueued for transmission, no BDS 190 is sent. If unsolicited grant data 178 has not been received, the uplink management system 188 may use the RACH to send BDS 190 to the satellite 102.

The priority of upstream data 112 that is enqueued for transmission may be designated by use of a particular buffer group. In one implementation, the uplink management system 188 may indicate the highest priority buffer group that has a nonzero amount of data. For example, if eight levels of priority, or eight buffer groups, are specified in the system, 3 bits in an 8 bit short BDS 190 may be used to indicate the highest priority buffer group that has a nonzero amount of data. The approximate amount of the data in the specified buffer group may be used to reduce the size of the short BDS 190. For example, if the short BDS 190 allocates 5 bits for approximate amount of data used, there are 32 possible "bins" of quantities of data that may be expressed. Continuing the example, bin 1 may specify an amount of data of 1-10 kb, bin 2 may be 11-100 kb, bin 3 may be 101-5000 kb, and so forth.

Responsive to the BDS 190 indicating a non-zero amount of data to transfer, the resource scheduler 166 onboard the satellite 102 may issue grant data 174 such as solicited grant data 176. The solicited grant data 176 specifies communication resources for the uplinks that are assigned to the UT 108 that is associated with, or otherwise responsive to, the BDS 190. The UT 108 receives the solicited grant data 176 and sends the upstream data 112 that is associated with the BDS 190. Continuing the example, at least some of the upstream data 112 stored in the specified buffer group may be transmitted.

During operation, the UT 108 may continue to receive or generate upstream data 112 to send to the satellite 102. The uplink management system 188 of the UT 108 may send short or long BDS 190 messages to the satellite 102. The long BDS 190 may comprise more detailed information about the priority and amount of upstream data 112 that has been stored for transmission, compared to the short BDS 190. This additional information in the long BDS 190 assists the resource scheduler 166 onboard the satellite 102 in determining the solicited grant data 176 that maintains a desired service level specified for the different priorities of upstream data 112. For example, the long BDS 190 may comprise a first octet that indicates which of the specified buffer groups have a nonzero amount of data for transmission. The long BDS 190 also includes detailed information about the amount of data in the specified buffer groups. For example, additional octets may be used, one octet comprising data indicative of the amount of data stored in that buffer group.

In some implementations, the long BDS 190 messages may be sent to the satellite 102 using the previously granted uplink communication resources, such as previously provided solicited grant data 176 or unsolicited grant data 178. This avoids the need to send an additional request using the RACH, reducing congestion on the RACH and latency associated with use of the RACH.

The satellite 102 executes a resource scheduler 166 that provides grant data 174 to UTs 108 that are being provided communication services. The resource scheduler 166 accepts scheduler input data 168 to operate one or more of a solicited grant system 170 or an unsolicited grant system 172. During operations the solicited grant system 170 may determine solicited grant data 176 based on one or more BDS 190. For example, the first UT 108(1) sends a BDS 190 indicative of enqueued upstream data 112. Responsive to this, the solicited grant system 170 allocates uplink communication resources to the first UT 108(1) to access the uplink and send this enqueued upstream data 112.

During operation, the unsolicited grant system 172 uses the scheduler input data 168 to determine unsolicited grant data (UGD) 178. The unsolicited grant system 172 may be configured to only provide UGD 178 to the UT 108 if there is no inferred backlog of upstream data 112 for that UT 108. The unsolicited grant system 172 may send UGDs 178 at repetition intervals that change over time. For example, a first set of initial UGDs 178 may be sent at a first repetition interval. Later, subsequent repetition intervals may vary relative to the first repetition interval, increasing in length if the UGDs 178 are not utilized to send upstream data 112 to the satellite 102, decreasing in length if the UGDs 178 are utilized. Operation of the unsolicited grant system 172 is discussed in more detail with regard to the following figures.

The allocation of uplink bandwidth, such as the number of bytes the UGD 178 allocates to the UT 108 to send on the uplink, may be fixed or variable. In one implementation all UGDs 178 provided by the unsolicited grant system 172 may have a fixed maximum number of bytes. In another implementation, the maximum number of bytes may be adjusted to particular UTs 108, UTs 108 in particular geographic areas, UTs 108 of a particular type or function, and so forth. In yet another implementation, the unsolicited grant system 172 may allocate uplink resources that have not been previously allocated by the solicited grant system 170.

The various techniques described in this disclosure may operate concurrently with one another. For example, a long BDS 190 may be sent on the uplink using the solicited grant data 176 while a short BDS 190 is sent using unsolicited grant data 178.

The system 100 may include one or more POP systems 146. Each POP system 146 may comprise one or more servers or other computing devices. Separate POP systems 146 may be located at different locations. In one implementation, a POP system 146 may be associated with providing service to a plurality of UTs 108 that are located in a particular geographic region.

The POP systems 146 may manage communication between the system 100 and the network 144. For example, a first POP system 146 may receive the upstream data 112 and send that upstream data 112 to the network 144. In another example, the first POP system 146 may receive the downstream data 142 and proceed to attempt delivery of the downstream data 142 to the UT 108.

The POP system 146 is in communication with one or more ground stations 106(1), 106(2), . . . , 106(G) and the management system 150. In some implementations one or more functions may be combined. For example, the POP system 146 may perform one or more functions of the management system 150. In another example, the POP system 146 may be included in an integrated ground station 106.

One or more servers 134 may communicate with the POP system 146 via the network(s) 144. The servers 134 may provide various functions, such as content delivery, navigation, data storage and retrieval, and so forth. For example, the servers 134 may store video content that may be requested and streamed to a user device 110. In some implementations the servers 134 may provide content provider data 136. The content provider data 136 may be used by the unsolicited grant system 172, resource scheduler 166, or other portions of the system 100 to facilitate operation. For example, the unsolicited grant system 172 or the resource scheduler 166 may determine and send unsolicited grant data 178 to a UT 108 based on the content provider data 136.

The satellite 102, the ground station 106, the user terminal 108, the user device 110, the management system 150, the POP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
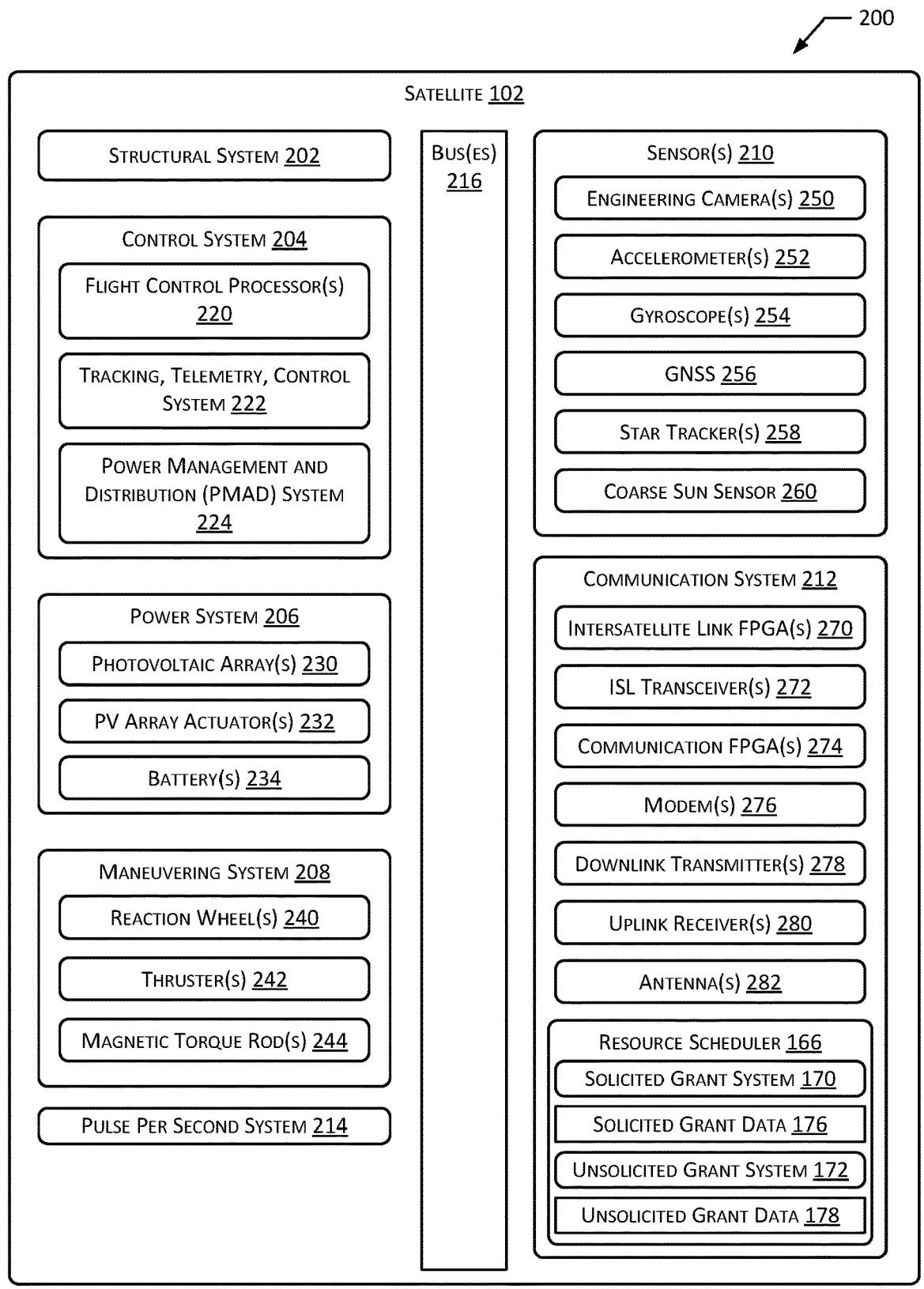
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 196. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may include the resource scheduler 166 that specifies uplink resources for a UT 108 to communicate with the satellite 102. The resource scheduler 166 may include one or more of the solicited grant system 170 or the unsolicited grant system 172. For example, the communication FPGA 274 may process a message such as BDS 190 that is received from a UT 108 by the uplink receiver 280. Responsive to the message, and subject to the availability of communication resources associated with the uplink, the solicited grant system 170 of the resource scheduler 166 executing on the communications FPGA 274 may determine solicited grant data 176. The unsolicited grant system 172 of the resource scheduler 166 may also determine and send unsolicited grant data 178 based on the scheduler input data 168. The grant data 174 is then sent using the downlink transmitter 278.

Figure 3:
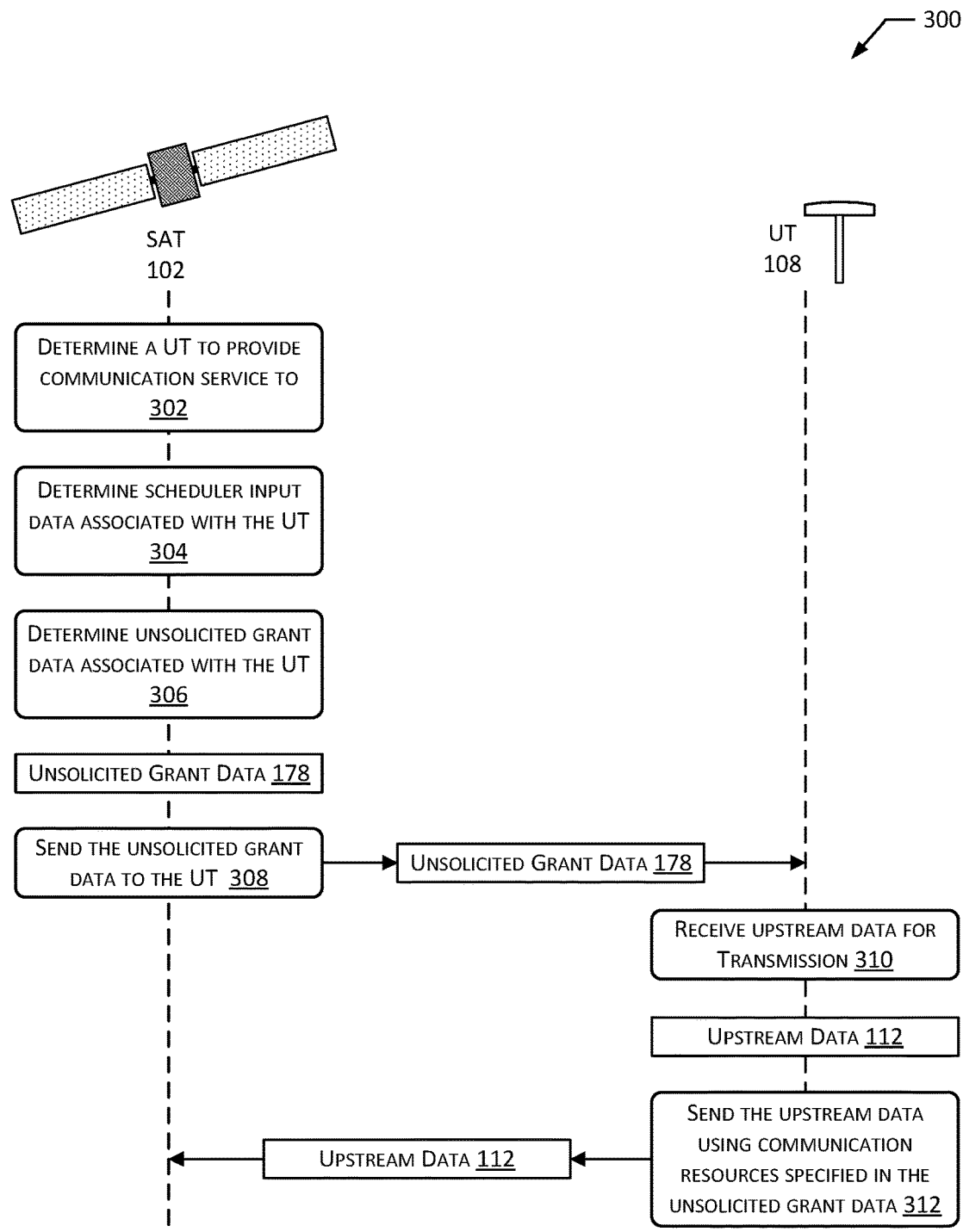
FIG. 3 illustrates an overview of a process for sending unsolicited grants of uplink resources to a user terminal, according to some implementations.

FIG. 3 illustrates a process 300 of providing unsolicited grants of uplink resources to a UT 108 based on scheduler input data 168, according to some implementations. The process may be implemented by one or more of the unsolicited grant system 172 executing as part of the resource scheduler 166 onboard the satellite 102. In this illustration, time generally increases from top to bottom. For example, an operation depicted at the top of the page may occur before an operation depicted at the bottom of the page.

At 302, a UT 108 is determined that the satellite 102 is to provide communication service to. For example, the satellite 102 may receive handover data 164 or other information from the management system 150 or another satellite 102, or an initial network entry message from the UT 108, that indicates the satellite 102 is to provide communication services to the UT 108.

At 304 scheduler input data 168 is determined. For example, the resource scheduler 166 may determine the scheduler input data 168. The scheduler input data 168 may comprise information about transferred data sent via the satellite 102 and involving a particular UT 108. The scheduler input data 168 may include information associated with particular UTs 108 such as a scheduling offset and inferred backlog value. The scheduler input data 168 is discussed in more detail with regard to FIG. 4.

At 306 unsolicited grant data 178 associated with the UT 108 is determined. For example, the resource scheduler 166 may determine and send the unsolicited grant data 178 as described with regard to FIGS. 5A and 5B. In some implementations the resource scheduler 166 may allocate a particular portion of available total uplink capacity for the use of unsolicited grants. For example, the resource scheduler 160 may allocate 90% of the total uplink capacity using solicited grant data 176 and 10% of the total uplink capacity using unsolicited grant data 178. In some implementations the allocation of the total uplink capacity between solicited and unsolicited grants may be dynamic and change from time to time. In other implementations, the allocation of uplink capacity may be performed at other levels of granularity, such as per geographic area basis or per UT 108. For example, a first geographic area may have 70% allocated to solicited grants while 30% is allocated to unsolicited grants, while a second geographic area may have 95% allocated to solicited grants and 5% allocated to unsolicited grants.

At 308 the unsolicited grant data 178 is sent from the satellite 102 to the UT 108.

At 310 upstream data 112 is received by the UT 108 for transmission to the satellite 102. For example, the user device 110 may send the upstream data 112 to the UT 108. The unsolicited grant data 178 may be received before or after receipt of the upstream data 112.

At 312, the upstream data 112 is sent from the UT 108 to the satellite 102 using the communication resources specified in the unsolicited grant data 178.

As shown in this illustration, the prospective issuance of the unsolicited grant data 178 to the UT 108 removes the necessity for the UT 108 to send a message to the satellite 102 requesting uplink resources. This reduces congestion on one or more of the RACH, the granted channel(s), and also substantially reduces overall system latency. For example, the reduction in latency is realized by removing the time associated with sending the BDS 190, having the BDS 190 processed by the resource scheduler 166, and the time associated with sending solicited grant data 176 to the UT 108.

Figure 4:
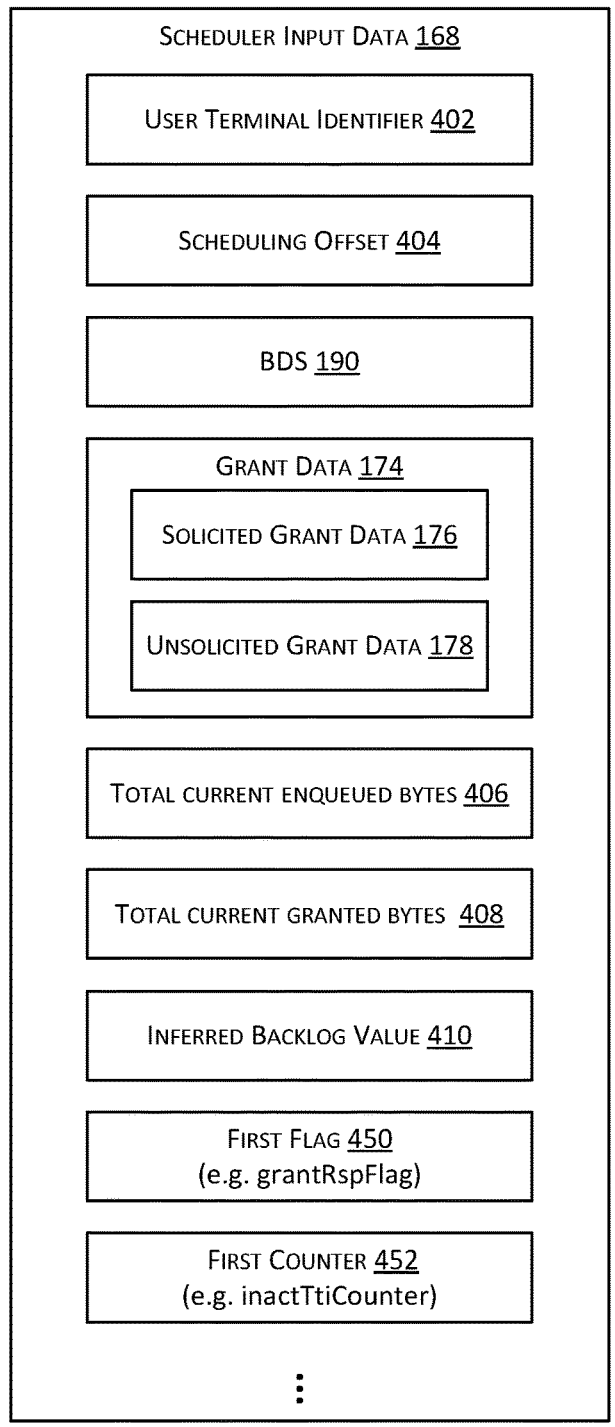
FIG. 4 illustrates scheduler input data, according to some implementations.

FIG. 4 illustrates at 400 the scheduler input data 168, according to some implementations. The data provided in the scheduler input data 168 may be associated with one or more UTs 108 as described below.

The scheduler input data 168 may comprise one or more of a user terminal identifier 402, a scheduling offset 404, the BDS 190, the grant data 174, total current enqueued bytes 406, total current granted bytes 408, inferred backlog value 410, a first flag 450, a first counter 452, or other data.

The user terminal (UT) identifier 402 is indicative of a particular UT 108 that is being serviced by the resource scheduler 166. For example, the UT identifier 402 may comprise a value assigned by the resource scheduler 166. In another example, the UT identifier 402 may comprise a media access control (MAC) address, device serial number, and so forth.

The scheduling offset 404 is indicative of a delay associated with communication between the satellite and the particular UT 108. The scheduling offset 404 may be based on one or more of a first propagation time indicative of a time-of-flight of a signal between the satellite 102 and a location associated with the UT 108, a processing delay time indicative of latency associated with operation of the communication system 212 of the satellite 102, a processing delay time indicative of latency associated with operation of the communication system 180, or other factors. In some implementations, the scheduling offset 404 may be indicative of a round-trip time, including processing, of an interaction between the UT 108 and the satellite 102.

As described above, the BDS 190 provides information about upstream data 112 that the UT 108 has enqueued for transmission to the satellite 102 on the uplink. The BDS 190 may include one or more of short BDS or long BDS.

The grant data 174 may comprise the solicited grant data 176 or the unsolicited grant data 178.

The total current enqueued bytes 406 comprises the total number of enqueued bytes that are known at the resource scheduler 166. For example, the total current enqueued bytes 406 may comprise a sum of the bytes indicated by the BDS 190 received from the UT 108 by the satellite 102.

The total current granted bytes 408 comprises the total number of bytes that have been allocated by previously issued grant data 174, but have not yet been used. For example, the total current granted bytes 408 is indicative of how many bytes have been allocated in grants to the UT 108 but have not yet been received from the UT 108 at the satellite 102.

The inferred backlog value 410 is indicative of a net amount of enqueued data from the UT 108 that has yet to be assigned grant data 174 that provides access to the uplink to the satellite 102. In one implementation the inferred backlog value 410 may be calculated based on a difference between the total current enqueued bytes 406 and the total current granted bytes 408.

The scheduler input data 168 may include data used during operation of the unsolicited grant system 172, such as the first flag 450 and the first counter 452.

The first flag 450 may be used to indicate if the UT 108 is waiting for grant data 174. For example, a value of "0" may indicate "no" and a value of "1" may indicate "yes".

The first counter 452 may be used to determine when a change in repetition interval for sending unsolicited grant data 178 may occur.

Figure 5A:
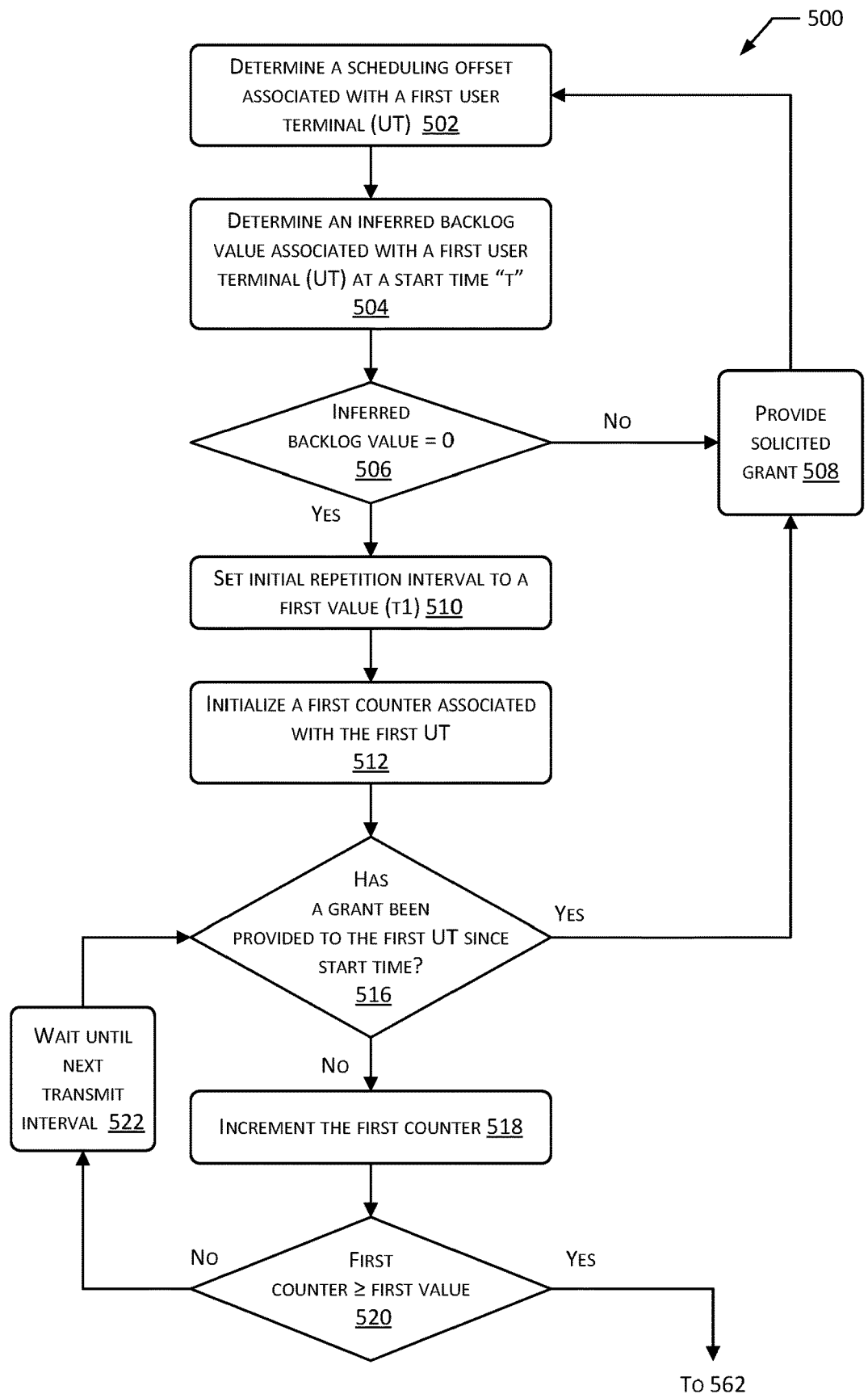
FIGS. 5A and 5B illustrate a process to determine the unsolicited grants, according to some implementations.
Figure 5B:
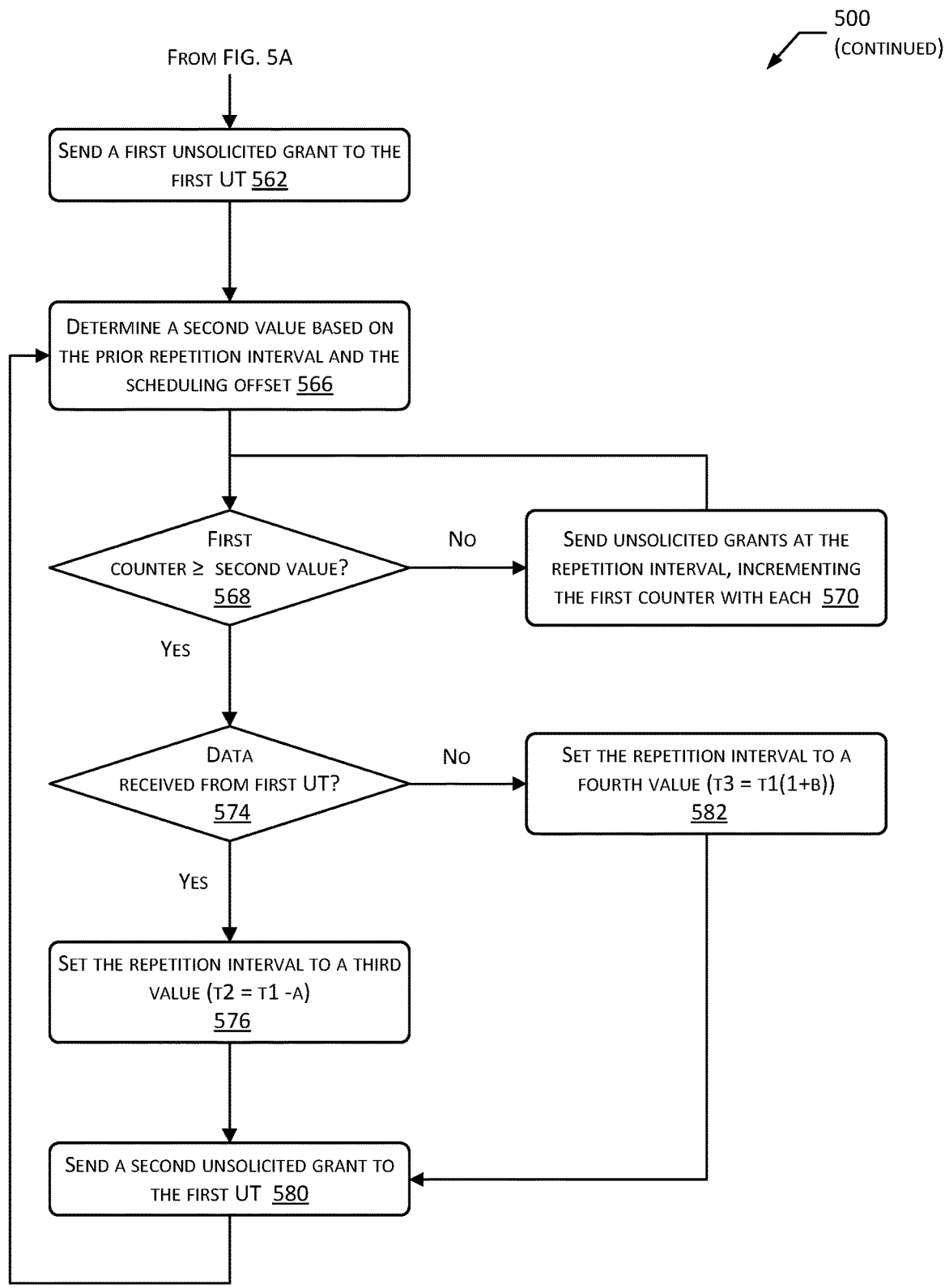

Use of the first flag 450 and the first counter 452 are discussed in more detail with regard to FIGS. 5A and 5B.

The scheduler input data 168 may be associated with one or more UTs 108. For example, a single value of scheduling offset 404 may be associated with the UTs 108 located within the same geographic area, or individual values of scheduling offset 404 may be maintained for each UT 108.

FIGS. 5A and 5B illustrate at 500 a process to determine the unsolicited grants, according to some implementations. The process may be implemented by one or more satellites 102, ground stations 106, the management system 150, and so forth. For example, the process may be executed as part of the operation of the resource scheduler 166 onboard the satellite 102.

At 502 a scheduling offset 404 associated with a first UT 108 is determined. In one implementation the scheduling offset 404 may be fixed value. In another implementation, the scheduling offset 404 may vary over time, such as due to the relative motion of the satellite 102 relative to the first UT 108. The scheduling offset 404 may be determined based on location of the satellite 102 and the geographic location of the first UT 108. A first geographic area that the first UT 108 is associated with may be determined. For example, the first UT 108 may be determined to be within the geographic boundary of a spot associated with a particular beam. A first propagation time indicative of a time-of-flight of a signal between the satellite 102 and a location associated with the first area is determined. For example, the first propagation time may be calculated based on a distance from the first satellite 102 to a center of the first area, divided by the speed of the signal. The scheduling offset 404 may also take into consideration delays associated with operation of devices. For example, a processing delay time indicative of latency associated with one or more of the communication system 212 or the communication system 180 may be determined.

At 504 an inferred backlog value 410 that is associated with the first UT 108 is determined at a start time "t". For example, the inferred backlog value 410 may be calculated based on a difference between the total current enqueued bytes 406 and the total current granted bytes 408.

At 506 a determination is made as to whether the inferred backlog value 410 associated with the first UT 108 is less than or equal to a backlog threshold value. The backlog threshold value may be set to provide desired operation of the system. For example, the backlog threshold value may be set to zero, such that UGD 178 would only be issued if there is no inferred backlog of data. In the implementation depicted, the backlog threshold value is zero. If not, the process proceeds to 508. This occurs when the first UT 108 has requested a solicited grant but has not yet been issued the solicited grant data 176. At 508 a solicited grant is provided. For example, the solicited grant system 170 may determine and send solicited grant data 176. From 508, the process may return to 502.

Returning to 506, if the inferred backlog value 410 associated with the first UT 108 is equal to zero, the process proceeds to 510. At 510 an initial repetition interval is set to a first value (t1). For example, the initial repetition interval may be a predetermined value. In some implementations different initial repetition values may be assigned to different UTs 108. For example, a random initial repetition value within a specified range may be assigned to the first UT 108. The variation in the initial repetition values, a change in the start time of a repetition interval, or both may be used to distribute the issuance of UGD 178 over time.

The repetition interval specifies when additional UGDs 178 will be provided to the first UT 108. The repetition interval may comprise an integer number multiple of a transmit interval. The transmit interval is indicative of duration associated with transmission of data. For example, a transmit interval may comprise the time associated with transmission of a superframe, frame, subframe, or other portion of data to or from the satellite 102.

In the implementation depicted, flags and counters may be used to indicate information about the state of the system to provide for control of the process. Individual instances of these flags and counters may be associated with a particular UT 108.

At 512 a first counter 452 associated with the first UT 108 is initialized to a value of zero.

In implementations in which a flag is used, a first flag 450 associated with the first UT 108 is initialized to a value of zero.

At 516 a determination is made as to whether a grant has been provided to the first UT 108 since the start time t. During operation of the system, it may be possible for the solicited grant system 170 to have issued solicited grant data 176 in the intervening time. If solicited grant data 176 has been issued, providing the UGD 178 may be unnecessary. If the determination at 516 is yes, the process proceeds to 508. If no, the process proceeds to 518.

At 518 the first counter is incremented.

At 520 a determination is made as to whether the first counter is greater than or equal to the first value specified by the initial repetition interval. This determination may act as a timer, waiting for the intervening transmit intervals to reach the end of the first repetition interval specified at 510. If no, the process proceeds to 522 and waits until the next transmit interval, then proceeds to 516. If yes, the process proceeds to 562.

In implementations in which a flag is used, the first flag 450 may be checked to determine if it still has a value of "0". As described below, issuance of UGD 178 or solicited grant data 176 may result in the value of the first flag 450 being set to a value of "1". The first flag 450 may thus be indicative of the system 100 having taken some action to provide uplink resources to the first UT 108 during the current repetition interval. If the determination is no, the process may proceed to 508. If yes, the process proceeds to 562.

At 562 first UGD 178(1) is sent to the first UT 108. For example, the unsolicited grant system 172 may allocate uplink resources and send the information as the unsolicited grant data 178 to the first UT 108. In implementations in which a flag is used, responsive to the sending of the first UGD 178(1), the first flag 450 is set to a value of "1".

At 566 a second value is determined based on the prior repetition interval and the scheduling offset 404. The second value is indicative of the time when a first set of UGD 178 will conclude. For example, the second value may comprise the sum of the start time t, the initial repetition interval t1, and the scheduling offset 404. More generally, the second value may be based on the prior repetition interval and the scheduling offset 404.

At 568 a determination is made as to whether the first counter is greater than or equal to the second value. If no, the process proceeds to 570. At 570 individual ones of the set of UGD 178 are sent at the current repetition interval, with the first counter 452 incrementing each time UGD 178 is sent. If at 568 the first counter equals (or is equal to or greater than) the second value, the process proceeds to 574.

At 574 a determination is made as to whether data has been received from the first UT 108. For example, has data from the first UT 108 been received on the uplink since the first time t? If yes, the satellite 102 has received data from the first UT 108, the process proceeds to 576.

At 576 the repetition interval is set to a third value that is less than the previously used repetition interval value. If the UT 108 is using the UGD 178 to send data to the satellite 102, it may be advantageous to provide the UGD 178 more frequently. As a result, the repetition interval is reduced at 576. In one implementation the repetition interval may be determined by subtracting a value from the current repetition interval. For example, t2=t1−A, where A is a constant. In some implementations other algorithms may be used. In this way, the repetition interval may decrease during subsequent iterations in an arithmetic fashion.

At 580 a second UGD 178(2) is sent to the first UT 108. For example, the unsolicited grant system 172 may allocate uplink resources and send the information as the unsolicited grant data 178 to the first UT 108.

Returning to 574, if no data has been received from the first UT 108, the process proceeds to 582. For example, no data has been received from the first UT 108 on the uplink since the beginning of the current set of UGD 178.

At 582 the repetition interval is set to a fourth value that is greater than the previously used repetition interval value. If the UT 108 is not using the UGD 178 to send data to the satellite 102, it may be advantageous to provide the UGD 178 less frequently and free up those uplink resources to be used by other UTs 108. As a result, the repetition interval is increased at 582. In one implementation the repetition interval may be determined by multiplying the current repetition interval by a specified value. For example, t3=t1 (1+B), where B is a constant. In some implementations other algorithms may be used. In this way, the repetition interval may increase during subsequent iterations in a multiplicative fashion.

As described above, the changes in the repetition intervals may be asymmetrical. As described above, the repetition interval may be reduced (sending UGD 178 more frequently) arithmetically, while the repetition interval is increased (sending UGD 178 less frequently) multiplicatively. This asymmetry facilitates more efficient utilization of the UGD 178 and prevents uncontrolled oscillation in the repetition interval.

In some implementations the first counter 452 associated with the first UT 108 may be again initialized to a value of zero before proceeding to 566.

The process then returns to 566. The process may be terminated under various conditions, such as handover of the first UT 108 to another portion of the communication system 212 onboard the satellite 102, handover of the first UT 108 to another satellite 102, receipt of a signal form the first UT 108 indicating it is shutting down, and so forth.

Figure 6:
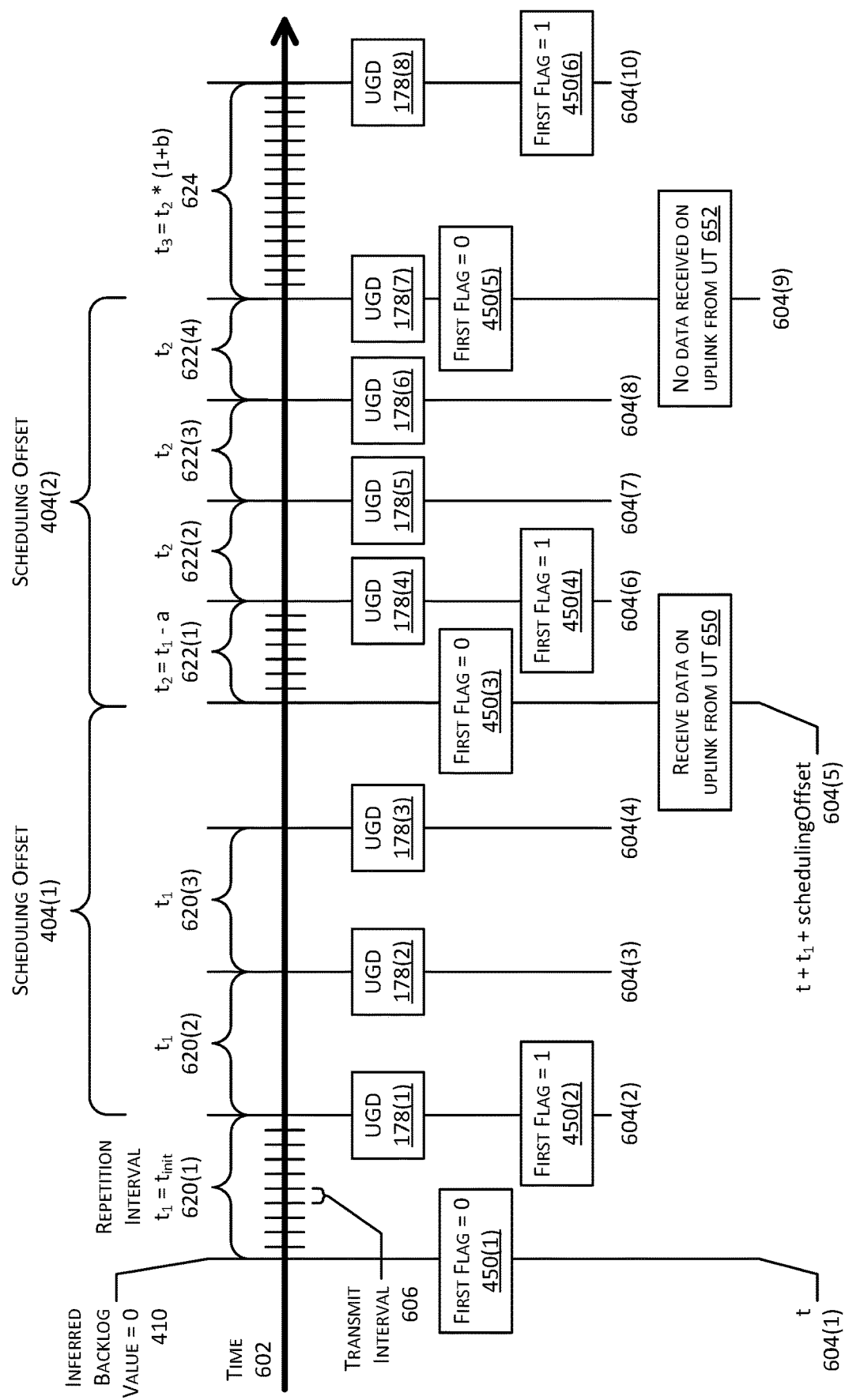
FIG. 6 illustrates a timeline of the process to provide unsolicited grants, according to some implementations.

FIG. 6 illustrates at 600 a timeline of the process to provide unsolicited grant data 178, according to some implementations. In this illustration time 602 progresses from left to right. Depicted for discussion are specified times 604(1)-(10) that are discussed in more detail below.

Depicted on the timeline are transmit intervals 606. The transmit intervals 606 are indicative of duration associated with transmission of data. For example, a transmit interval 606 may comprise the time associated with transmission of a superframe, frame, subframe, or other portion of data.

The duration of the repetition intervals are determined as described previously with regard to FIGS. 5A and 5B. Three repetition intervals are depicted: a first repetition interval 620, a second repetition interval 622, and a third repetition interval 624. Each repetition interval may have a respective duration that is an integer number multiple of the transmit interval 606. For example, the first repetition interval 620 has a duration of ten transmit intervals 606, the second repetition interval 622 has a duration of seven transmit intervals 606, and the third repetition interval 624 has a duration of fifteen transmit intervals 606. In this illustration, there are three instances of the first repetition interval 620(1)-(3), four instances of the second repetition interval 622(1)-(4), and a first instance of the third repetition interval 624.

In this illustration, unsolicited grant data (UGD) 178 is sent to the UT 108 at times 604(2), 604(3), 604(4), 604(6), 604(7), 604(8), 604(9), and 604(10).

Also shown is the scheduling offset 404. In this illustration, the scheduling offset 404 is shown extending from an end of the first repetition interval 620(1) until a beginning of a second repetition interval 622(1).

As described above, the first flag 450 is set at a value of "0" at the beginning of a set of repetition intervals. During operation of the algorithm described above with regard to FIGS. 5A and 5B, first flag 450 values change during operation.

In this illustration, at time 604(1) the first flag 450(1) is set to 0 as discussed previously, at time 604(2) the first flag 450(2) is set to 1 as discussed previously.

At time 604(5) the first counter 452 has reached the second value that is based on the prior repetition interval and the scheduling offset 404, as discussed with regard to 566. At time 604(5) the first flag 450(3) is set to 0 as discussed with regard to 568. At time 604(5) the satellite 102 receives at 650 upstream data 112 from the UT 108. Based on this, as discussed with regard to 582, the second repetition interval 622 is longer than the first repetition interval 620.

At time 604(9) the first counter 452 has again reached the second value that is based on the prior repetition interval and the scheduling offset 404, as discussed with regard to 566. At time 604(9) the first flag 450(5) is set to 0 as discussed with regard to 568 during a subsequent iteration of the process. At time 604(6) the first flag 450(4) is set to 1 as discussed with regard to 580. At time 604(9) the satellite 102 at 652 does not receive upstream data 112 from the UT 108. Based on this, as discussed with regard to 576, the third repetition interval 624 is shorter than the second repetition interval 622. At time 604(10) the first flag 450(6) is set to 1 as discussed with regard to 580 during a subsequent iteration of the process.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a first satellite comprising:
      a first communication system; and
      a first set of one or more processors executing instructions to:
         determine a scheduling offset indicative of a delay associated with communication between the first satellite and a first user terminal (UT);
         determine that an inferred backlog value associated with the first UT at a first time is less than a backlog threshold value, wherein the inferred backlog value is indicative of data enqueued for transmission from the first UT to the first satellite;
         determine, at a second time, a first repetition interval indicative of a time interval between providing consecutive unsolicited grant data (UGD) to the first UT, wherein the UGD is indicative of communication resources associated with an uplink to the first satellite that is allocated to the first UT;
         send, at successive times based on the first repetition interval and using the first communication system, individual ones of a first set of UGD;
         determine, at a third time that is based on the scheduling offset and the second time, a second repetition interval indicative of a time interval between providing consecutive UGD to the first UT, wherein the second repetition interval differs from the first repetition interval; and
         send, at successive times based on the second repetition interval and using the first communication system, individual ones of a second set of UGD.

2. The system of claim 1, the first set of one or more processors executing instructions to:
   determine a first geographic area that the first UT is associated with;
   determine a first propagation time indicative of a time-of-flight of a signal between the first satellite and a location within the first geographic area;
   determine a first processing delay time indicative of latency associated with operation of the first communication system; and
   determine the scheduling offset based on the first propagation time and the first processing delay time.

3. The system of claim 1, the first set of one or more processors executing instructions to:
   determine, based on buffer data status received from the first UT, total current enqueued bytes associated with the first UT;
   determine total current granted bytes indicative of a sum of bytes associated with grants issued to the first UT and not yet used; and
   determine the inferred backlog value based on a difference between the total current enqueued bytes and the total current granted bytes.

4. The system of claim 1, the first set of one or more processors executing instructions to:
   determine, after the second time and before the third time, that data has not been received from the first UT during a current repetition interval; and
   determine the second repetition interval by multiplying the first repetition interval by a first value.

5. The system of claim 1, the first set of one or more processors executing instructions to:
   determine, after the second time and before the third time, that data has been received from the first UT during a current repetition interval; and
   determine the second repetition interval by subtracting a first value from the first repetition interval.

6. The system of claim 1, the first set of one or more processors executing instructions to:
   determine, before sending the individual ones of the UGD, that no grant data indicative of communication resources associated with the uplink to the first satellite has been allocated to the first UT.

7. The system of claim 1, wherein:
   access to the uplink is divided into transmit intervals having a fixed duration;

the scheduling offset consists of a first integer number of the transmit intervals;
the first repetition interval consists of a second integer number of the transmit intervals; and
the second repetition interval consists of a third integer number of the transmit intervals, wherein the second integer number differs from the third integer number.

8. A method comprising:
determining a scheduling offset indicative of a delay associated with communication between a first satellite and a first user terminal (UT);
determining that a first value associated with the first UT at a first time is less than a backlog threshold value, wherein the first value is indicative of data enqueued for transmission from the first UT to the first satellite;
determining, at a second time, a first repetition interval indicative of a time between providing consecutive instances of unsolicited grant data (UGD) to the first UT, further wherein the UGD is indicative of communication resources associated with an uplink to the first satellite that is allocated to the first UT;
sending, based on the first repetition interval, individual ones of a first set of UGD from the first satellite to the first UT;
determining, at a third time that is based on the scheduling offset and the second time, a second repetition interval indicative of a time between providing consecutive instances of UGD to the first UT; and
sending, based on the second repetition interval, individual ones of a second set of UGD from the first satellite to the first UT.

9. The method of claim 8, further comprising:
determining a first geographic area that the first UT is associated with;
determining a first propagation time indicative of a time-of-flight of a signal between the first satellite and a location within the first geographic area;
determining a first processing delay time indicative of latency associated with a communication system; and
determining the scheduling offset based on the first propagation time and the first processing delay time.

10. The method of claim 8, further comprising:
determining, based on buffer data status received from the first UT, total current enqueued bytes associated with the first UT;
determining total current granted bytes indicative of a sum of bytes associated with grants issued to the first UT and not yet used; and
determining the first value based on a difference between the total current enqueued bytes and the total current granted bytes.

11. The method of claim 8, further comprising:
determining, after the second time and before the third time, that data has not been received from the first UT during a current repetition interval; and
determining the second repetition interval by multiplying the first repetition interval by a second value.

12. The method of claim 8, further comprising:
determining, after the second time and before the third time, that data has been received from the first UT during a current repetition interval; and
determining the second repetition interval by subtracting a second value from the first repetition interval.

13. The method of claim 8, further comprising:
determining, before sending the individual ones of the UGD, that no grant data indicative of communication resources associated with the uplink to the first satellite has been allocated to the first UT.

14. The method of claim 8, wherein:
access to the uplink is divided into transmit intervals having a fixed duration;
the scheduling offset consists of a first integer number of the transmit intervals;
the first repetition interval consists of a second integer number of the transmit intervals; and
the second repetition interval consists of a third integer number of the transmit intervals, wherein the second integer number differs from the third integer number.

15. The method of claim 8, further comprising:
determining a total uplink capacity available at the first satellite;
allocating a first portion of the total uplink capacity to unsolicited grants; and
allocating at least a portion of the first portion to individual user terminals using UGD.

16. A system comprising:
a first satellite comprising:
a first communication system; and
a first set of one or more processors executing instructions to:
determine that a first value associated with a first user terminal (UT) at a first time is less than a backlog threshold value, wherein the first value is indicative of data enqueued for transmission from the first UT;
determine, at a second time, a first repetition interval indicative of a time interval between providing consecutive unsolicited grant data (UGD) to the first UT, further wherein the UGD is indicative of communication resources associated with an uplink to the first satellite that is allocated to the first UT;
send, at successive times based on the first repetition interval and using the first communication system, individual ones of a first set of UGD;
determine, at a third time that is based on the second time, a second repetition interval indicative of a time interval between providing consecutive UGD to the first UT; and
send, at successive times based on the second repetition interval and using the first communication system, individual ones of a second set of UGD.

17. The system of claim 16, the first set of one or more processors executing instructions to:
determine total current enqueued bytes associated with the first UT as reported by buffer data status received from the first UT;
determine total current granted bytes indicative of a sum of bytes associated with grants issued to the first UT and not yet used; and
determine the first value based on a difference between the total current enqueued bytes and the total current granted bytes.

18. The system of claim 16, the first set of one or more processors executing instructions to:
determine, after the second time and before the third time, that data has not been received from the first UT during a current repetition interval; and
determine the second repetition interval by multiplying the first repetition interval by a second value.

19. The system of claim 16, the first set of one or more processors executing instructions to:
- determine, after the second time and before the third time, that data has been received from the first UT during a current repetition interval; and
- determine the second repetition interval by subtracting a second value from the first repetition interval.

20. The system of claim 16, the first set of one or more processors executing instructions to:
- determine, before sending the individual ones of the UGD, that no grant data indicative of communication resources associated with the uplink to the first satellite has been allocated to the first UT.

\* \* \* \* \*